Feb. 1, 1955
L. H. TAYLOR ET AL
2,701,143
SHORT TURN STEERING MECHANISM
Filed Jan. 31, 1951
3 Sheets-Sheet 3
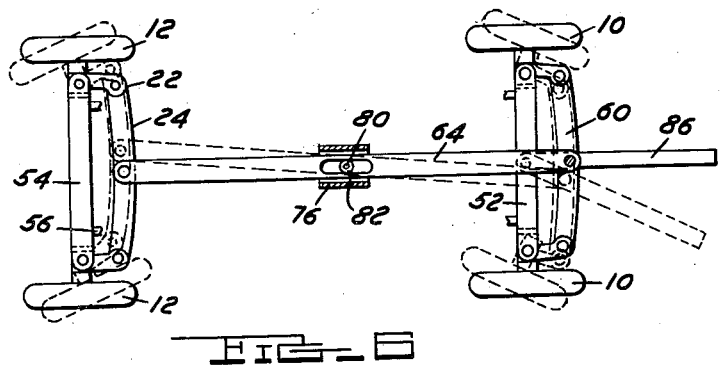
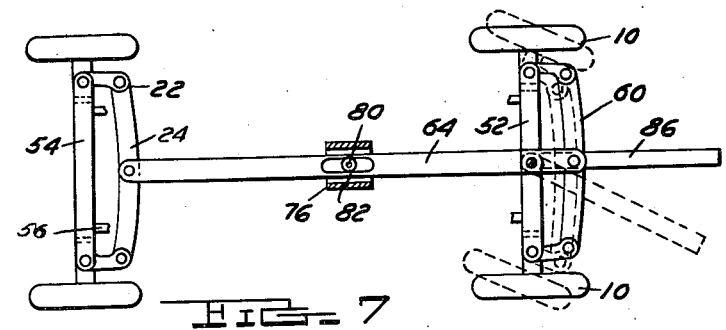
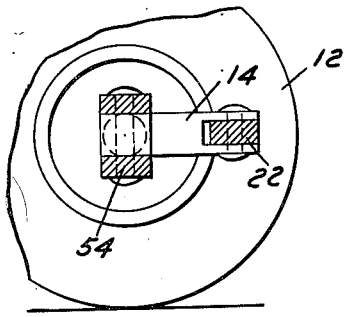
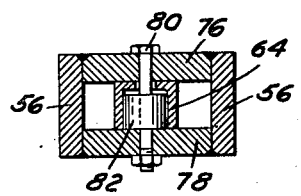
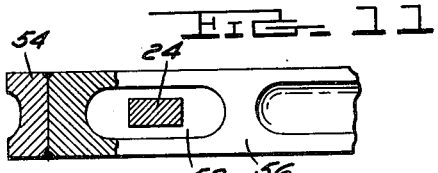
INVENTOR.
LLOYD H. TAYLOR
LLOYD G. COPEMAN
BY
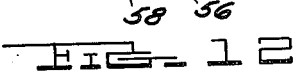
ATTORNEYS United States Patent Office 2,701,143
Patented Feb. 1, 1955

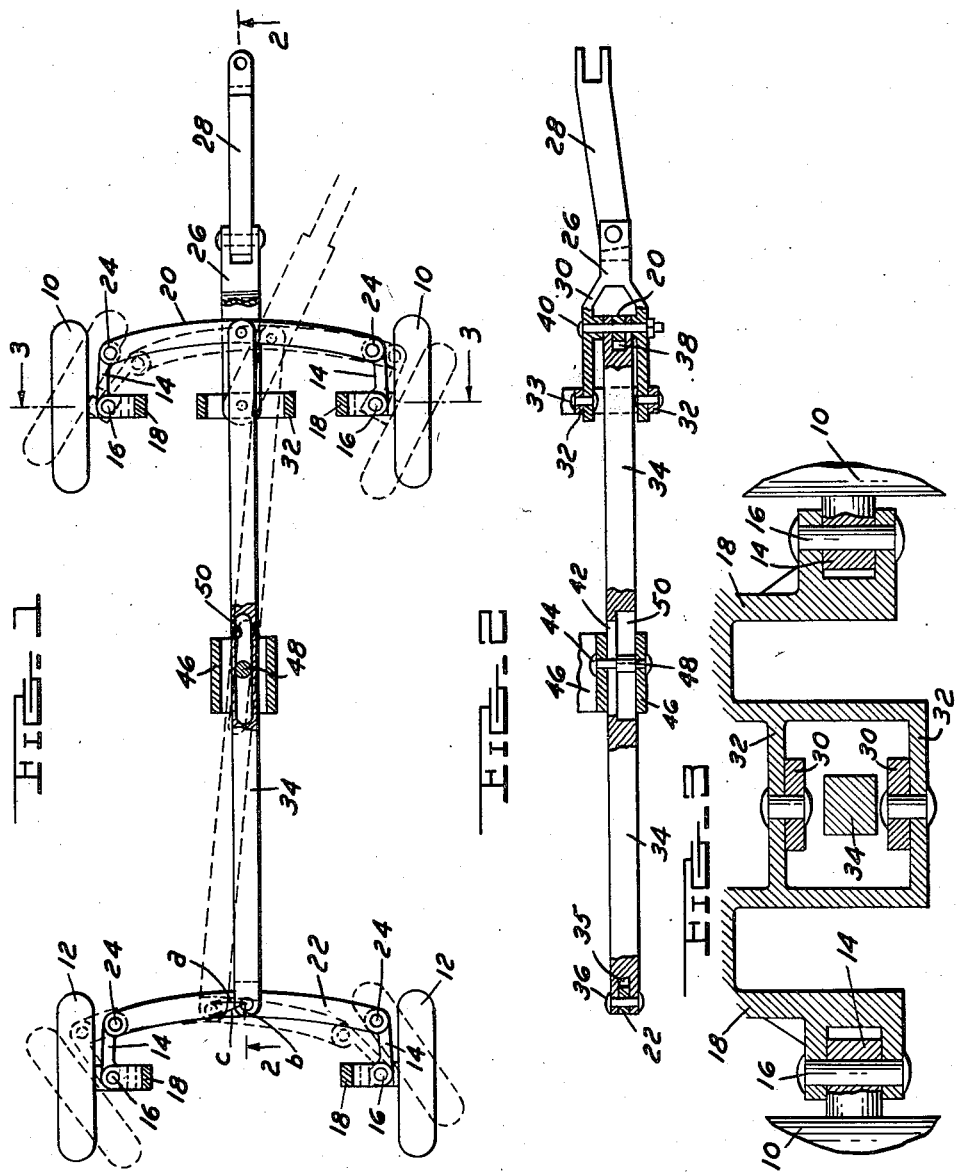

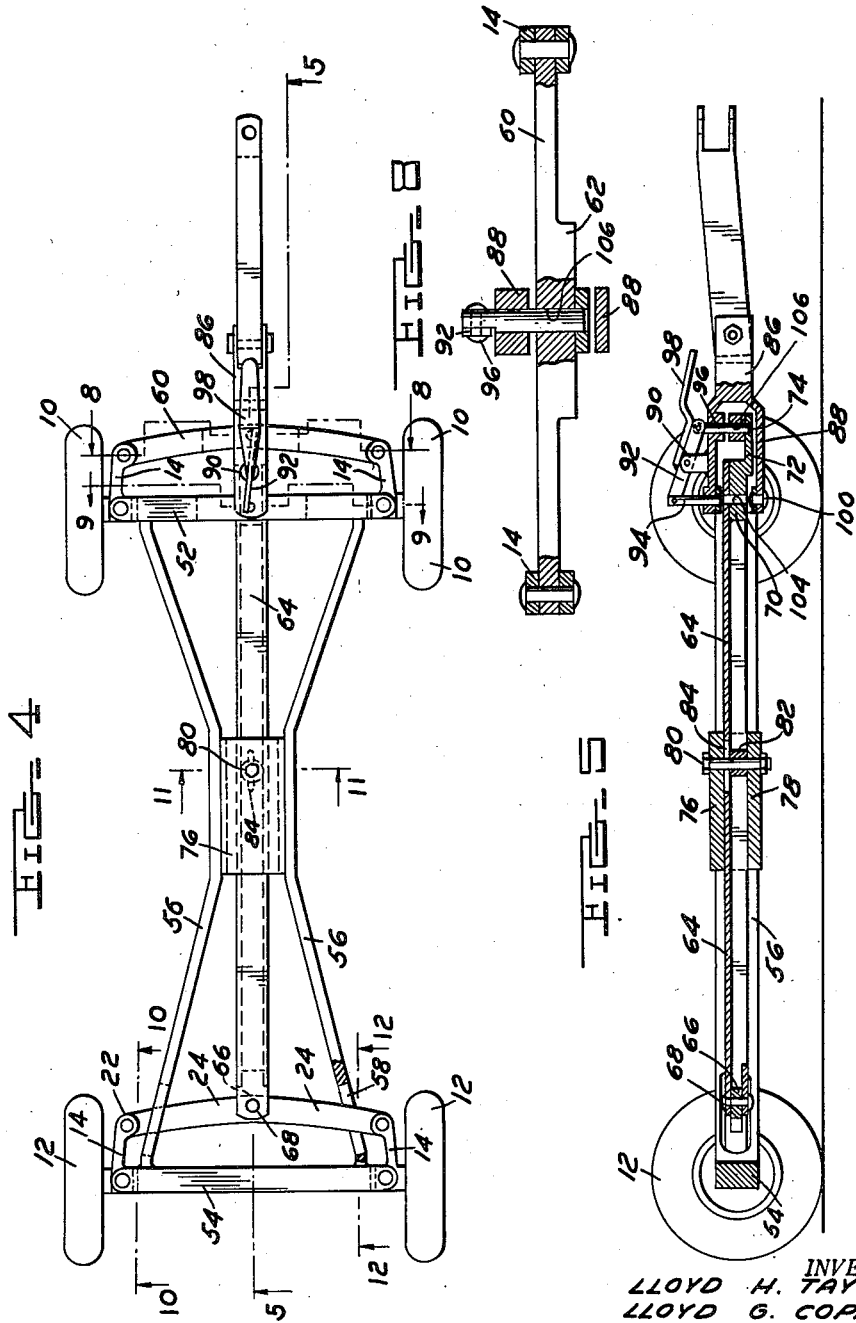

2,701,143

SHORT TURN STEERING MECHANISM

Lloyd H. Taylor and Lloyd G. Copeman, Metamora, Mich., assignors to Copeman Laboratories Company, Flint, Mich., a corporation of Michigan Application January 31, 1951, Serial No. 208,686

7 Claims. (Cl. 280—99)

This invention relates to a steering mechanism and more particularly to trailers in which the front and rear wheels are connected by a steering mechanism which enables the trailer to execute very sharp turns.

It is an object of the invention to provide a trailer wherein all the wheels of the trailer will positively track the wheels of the towing vehicle.

Another object of the invention resides in the provision of a steering mechanism for a trailer which is designed to permit easy steering of the trailer and more particularly a steering mechanism which requires the application of a minimum lateral force on the trailer drawbar for turning the wheels of the trailer.

It is a further object of the invention to provide a steering mechanism for a trailer which is simple but durable in its construction.

A still further object of the invention is to provide a steering mechanism for a trailer which includes a latch arrangement selectively operable to provide either four- or two-wheel turning of the trailer.

Other objects and advantages of our trailer construction will become apparent from the following description when considered in conjunction with the accompanying drawings wherein.

Fig. 1 is a diagrammatic plan view, partly in section, of our trailer.

Fig. 2 is a sectional view taken along the lines 2—2 in Fig. 1.

Fig. 3 is a sectional view taken along the lines 3—3 in Fig. 1.

Fig. 4 is a plan view similar to Fig. 1 showing the steering mechanism built into a trailer chassis.

Fig. 5 is a sectional view taken along the lines 5—5 in Fig. 4.

Fig. 6 is a diagrammatic plan view of the trailer illustrated in Fig. 4 and showing the steering mechanism arranged for four-wheel turning.

Fig. 7 is a view similar to Fig. 6 showing the steering mechanism arranged for two-wheel turning.

Fig. 8 is a sectional view along the lines 8—8 in Fig. 4.

Fig. 9 is a sectional view along the lines 9—9 in Fig. 4.

Fig. 10 is a fragmentary sectional view along the lines 10—10 in Fig. 4.

Fig. 11 is a sectional view along the lines 11—11 in Fig. 4.

Fig. 12 is a fragmentary sectional view along the lines 12—12 in Fig. 4.

Referring to the drawings and particularly to Fig. 1, the basic features of our trailer steering mechanism are illustrated. The trailer is provided with a pair of front wheels 10 and a pair of rear wheels 12. Wheels 10 and 12 are carried by steering knuckles 14 which are pivoted as at 16 on a supporting member 18 on the trailer body or chassis (not shown) for turning in a substantially horizontal plane. The steering knuckles 14 for the front wheels of the trailer are connected together for movement in unison by a tie rod 20. The steering knuckles 14 for the rear wheels are similarly connected by a tie rod 22. The connections between the tie rods 20 and 22 and their respective steering knuckles are in the form of pivots 24.

A drawbar 26, which pivotally supports a tongue 28, has its inner end shaped as a yoke 30, the legs of which are vertically aligned and pivoted at their ends on opposed supports 32 on the trailer chassis of the body as by rivets 33. A lever 34 extends longitudinally of the trailer with its rear end bifurcated as at 35 and pivotally connected with tie rod 22 as by a rivet 36. Rivet 36 passes through the bifurcated end of lever 34 and through the midpoint of tie rod 22. At its front end lever 34 has its end bifurcated as at 38 to receive tie rod 20. A bolt 40 passes through the legs of yoke 30 on drawbar 26, through the bifurcated end 38 of lever 34, and through tie rod 20 at its midpoint. Bolt 40 thus effectively pivotally connects the drawbar 26 with the tie rod 20 and the front end of lever 34. At its center portion lever 34 is slotted longitudinally as at 42 to accommodate a pin 44 which is vertically arranged on a supporting portion 46 of the vehicle chassis or body. Pin 44 supports a roller 48 which is disposed within a longitudinal trackway 50 formed on the underside of lever 34 adjacent slot 42. Roller 48 forms a stationary bearing for guiding lever 34 in its pivotal movement and movement longitudinally of the trailer.

It will be observed that, when the drawbar 26 is turned from the position shown in solid lines to that shown in broken lines in Fig. 1, the drawbar pivots about rivets 33 as a center. Since tie rod 20 and lever 34 are both connected with drawbar 26 by bolt 40, both the tie rod and the front end of lever 34 will thereby be shifted to the right to the position shown in broken lines. This causes the front wheels 10 to assume the turned position shown in broken lines. Since the bolt 40 which connects the front end of lever 34 with drawbar 26 is shifted to the right about the rivets 33 as a center, it will be noted that lever 34 not only pivots about roller 48 but is also shifted rearwardly. In other words, while the lever 34 itself pivots about roller 48, the front end of lever 34 follows a path generated by a radius the center of which is at 33. The drawbar therefore exerts a force on the front end of lever 34 having one component extending laterally of lever 34 and another component extending longitudinally of lever 34. Thus, in effect, the drawbar 26 pushes the front end of lever 34 rearwardly and to the right.

Since pivoting drawbar 26 to the broken line position pushes the front end of lever 34 in a direction rearwardly and to the right, it will be appreciated that the rear end of lever 34 exerts a force on tie rod 22 rearwardly and to the left. In other words, at the rivet 36, lever 34 exerts a force having a lateral component $a$ and a rearward component $b$, the resultant of these components on the tie rod 22 being a force $c$ which acts through a line passing through rivet 36 and extending in a direction rearwardly and to the left of the vehicle. This force shifts tie rod 22 from the solid to the broken line position, and the steering knuckles 14 and rear wheel 12 assume the position shown in broken lines. Since lever 34 is shifted rearwardly when the trailer is turned from a straight path, it will be observed that the lever arm between pin 44 and bolt 40 is slightly shortened while the lever arm between pin 44 and rivet 36 is increased in length. Therefore wheels 12 at the rear end of the trailer are turned a slightly greater extent than the wheels 10 at the front end of the trailer. We have found that this slight exaggerated turning of the rear wheels of the trailer produces very good traction.

When the tongue 28 is pivoted from the position shown in broken lines to that shown in solid lines, drawbar 26 exerts a force on tie rod 20 and the front end of lever 34 in a direction forwardly and to the right of the trailer. Likewise, the rear end of lever 34 exerts a pull on tie rod 22 in a direction forwardly and to the left of the trailer. Since the tie rods 20 and 22 are actually shifted in a direction longitudinally of the trailer when the trailer is turned, it will be appreciated that the force actually exerted on these members by the lever 34 in my arrangement is less than it would be if the lever had a fixed pivot at pin 44 and the ends of the lever were slotted to accommodate for the longitudinal shifting of the tie rods 20 and 22.

In Fig. 4 we have illustrated our steering arrangement as it might be incorporated in a trailer chassis. The trailer chassis includes a front axle 52 and a rear axle 54 which are connected together by longitudinal frame members 56. Frame members 56 are secured to axles 52 and 54 as by welding. The steering knuckles 14 are pivoted at the ends of axles 52 and 54 for turning about substantially vertical axes. Steering knuckles 14 will be toed in slightly as is conventional to compensate for the different radii of turning of the wheels on the two sides of the trailer. Frame members 56 are slotted as at 58 to enable the tie rod 22 to pass freely therethrough in a direction laterally of the trailer (Fig. 11). The front tie rod 60 is similar to the rear tie rod 22 except that it has a thickened portion 62 at the center thereof. As in the previous embodiment described, the front and rear tie rods 60 and 22 are connected together by a lever 64 which is preferably in the shape of a channel. At its rear end lever 64 has a bracket 66 welded thereto. Lever 64 and tie rod 22 are pivoted together at bracket 66 as by a rivet 68. At its front end lever 64 has a heavy bracket 70 welded thereto. Bracket 70 has a forwardly extending portion 72 provided with a vertically extending aperture 74. At the center of the trailer a pair of plates 76 and 78 are extended across frame members 56 and are welded thereto. Plates 76 and 78 are spaced apart vertically to slidably receive lever 64 therebetween. A pin 80 extends through plates 76 and 78 and rotatably supports a roller 82 which is received within the channel-shaped portion of lever 64 and engages the side walls thereof. The top face of lever 64 is slotted as at 84 to accommodate pin 80 and to permit longitudinal shifting of the lever.

The drawbar 86 is fashioned at its inner end with a yoke 88. A fixed post 90 on yoke 88 pivotally supports a rocking lever 92. At one end of lever 92 there is freely suspended a pin 94 and at the other end a pin 96. Lever 92 is also provided with a hand lever 98 for rocking the lever on post 90. On its lower side, yoke 88 is pivotally connected with axle 52 as by a rivet 100. Rivet 100 is disposed directly below pin 94. Axle 52 is centrally slotted as at 102 (Fig. 9) to permit the forward end of lever 64 to extend therethrough. Rivet 100 is disposed vertically below pin 94, and yoke 88 and axle 52 are provided with vertically aligned apertures through which pin 94 projects. Lever 64 and bracket 70 at the front end thereof are also apertured as at 104 which, when the wheels of the trailer are arranged to travel a straight path, are vertically aligned with pin 94 so that the lever 92 can be rocked downwardly at its rear end to project pin 94 into aperture 104. Yoke 88 is also apertured at its front end to receive pin 96, and tie rod 60 is provided with an aperture 106 which, when the wheels and the drawbar of the trailer are aligned for traveling a straight path, is vertically aligned with pin 96 and the aperture 74 in bracket 70. The arrangement is such that lever 92 can be rocked in one direction to project pin 96 into registering openings 106 and 74 or in the other direction to retract pin 96 out of opening 74 and project pin 94 into opening 104.

When lever 92 is in the position illustrated in Fig. 5, it will be noted that the drawbar 86 is pivotally connected with axle 52 by the pin 94 and rivet 100 and that the drawbar 86, lever 64, and tie rod 60 are connected together by the pin 96. Under such circumstances, when the drawbar 86 is pivoted to one side, as to the broken line position in Fig. 6, the front end of lever 64 and tie rod 60 are shifted rearwardly and to the right to the broken line position illustrated in Fig. 6 in a manner similar to the operation described with reference to Fig. 1. If the drawbar 86 is then shifted back to the straight position, hand lever 98 may be gripped and pulled upwardly to rock lever 92 on post 90 such that pin 96 is retracted out of opening 74 and pin 94 is projected into opening 104. If the drawbar 86 is then in either direction pivoted, tie rod 60 will be shifted to the broken line position illustrated in Fig. 7; but the lever 64 will remain stationary, since it is fixed at the center of turning of drawbar 86.

The arrangement of rocking lever 92 thereby provides a convenient means for selectively shifting the steering mechanism to either a four- or two-wheel turning. Thus a trailer provided with the steering mechanism illustrated in Fig. 4 possesses the advantages of sharp turning and true tracking of the towing vehicle and nevertheless may be adapted for conventional front-wheel turning, whenever the latter may be desirable.

Thus it will be seen that we have provided a trailer provided with a steering mechanism which enables the trailer, or several trailers connected in series, to accurately track a towing vehicle. An arrangement of this type is highly desirable not only because it enables making very sharp turns but also because it reduces the clearance necessary at corners and the like for turning a vehicle towing one or more trailers. In factories, for instance, where the space provided for aisleways is maintained at a minimum, only sufficient clearance is required to enable the towing vehicle to turn, since the trailers, when provided with the steering mechanism of this invention will accurately track the towing vehicle.

In addition, it will be noted that, by constructing the steering mechanism such that the lever connecting the front and rear tie rods shifts axially of the trailer as it rotates around its central pivot, the force required for turning the trailer is reduced to a minimum. This enables the trailer to be turned manually when necessary much more readily. At the same time, it reduces the bending stress on the lever connecting the front and rear tie rods and enables the construction of this lever of a relatively light section.

We claim:

1. In a vehicle trailer the combination of a pair of front wheels, a pair of rear wheels, tie rods extending between and connecting the wheels in each pair for turning in unison, a single rigid lever extending longitudinally of the trailer, a fixed pivot member on the trailer, said lever having a fixed pivotal connection at each end thereof with said tie rods and a sliding pivotal connection with said fixed pivot member on the trailer at a point intermediate the ends of the lever.

2. In a vehicle the combination of a pair of front wheels, a pair of rear wheels, tie rods extending between and connecting the wheels in each pair for turning in unison, a single rigid lever extending longitudinally of the vehicle, a fixed pivot member on the trailer, said lever having a fixed pivotal connection at each end thereof with said tie rods and a sliding pivotal connection with said fixed pivot member on the vehicle at a point intermediate the ends of the lever, the pivotal connection between said lever and one of said tie rods being readily disconnectable, and means for disconnecting said last mentioned pivotal connection.

3. The combination set forth in claim 2 wherein the end of said lever adjacent said disconnectable pivotal connection is provided with two spaced apart openings therein, the tie rod adjacent said end of said lever having an opening adapted to register with one of the openings in said lever and said fixed part of said vehicle having an opening adapted to register with the other opening in said lever, a rocking lever pivotally supported intermediate its ends on a fixed part of the vehicle and having pins on opposite sides of its pivotal support projectable, when the rocking lever is pivoted, into said openings when the openings are in registering relation whereby, when the rocking lever is pivoted in one direction, one of said pins is projected into the registering openings in said lever and tie rod and the other pin is retracted from within the registering openings in said lever and said fixed part of the trailer so that said lever operatively connects the front and rear wheels for turning in unison and, when said rocking lever is pivoted in the opposite direction, said pins are oppositely actuated to operatively disconnect said front and rear wheels and lock said rear wheels against turning.

4. In a vehicle the combination of a pair of front wheels, a pair of rear wheels, said wheels each being provided with a steering arm pivotable about vertical axes for turning said wheels, a tie rod extending between and connecting the steering arms for the rear wheels, said tie rods being bodily shifted in a direction transversely and longitudinally of the vehicle when said wheels are turned, a single rigid lever pivotally connected adjacent its opposite ends directly with said tie rods such that the ends of said lever are shifted in directions longitudinally and transversely of the vehicle when the wheels are turned, a fixed pivotal support on the vehicle intermediate said front and rear tie rods, and means forming a sliding pivotal connection between said fixed support and said lever.

5. In a vehicle the combination of a pair of front wheels, a pair of rear wheels, said wheels each being provided with a steering arm pivotable about vertical axes for turning said wheels, a tie rod extending between and connecting the steering arms for the rear wheels, said tie rods being bodily shifted in a direction transversely and longitudinally of the vehicle when said wheels are turned, a single rigid lever pivotally connected adjacent its opposite ends with said tie rods such that the ends of said lever are shifted with said tie rods in directions longitudinally and transversely of the vehicle when the wheels are turned, a fixed pivotal support on the vehicle intermediate said front and rear tie rods, and means forming a sliding pivotal connection between said support and said lever, said pivotal connection between said support and said lever being disposed substantially equidistant between the pivotal connections between said lever and said tie rods when the wheels are centrally positioned.

6. In a vehicle the combination of a pair of rear wheels, a tie rod extending between and connecting the wheels for turning in unison, a single rigid lever extending longitudinally of the vehicle, a fixed support on the vehicle spaced forwardly of said rear wheels, said lever being pivoted on said support and being axially slidable thereon, said lever having its rear end pivotally and fixedly connected with said tie rod whereby, when the front end of said lever is swung to either side of the vehicle, said lever pivots about said fixed support, shifts longitudinally of the vehicle, and causes said tie rod to shift in a direction transversely and longitudinally of the vehicle to turn said rear wheels.

7. In a vehicle the combination of a pair of front wheels, a pair of rear wheels, tie rods extending between and connecting the wheels in each pair for turning in unison, a lever extending longitudinally of the vehicle, said lever having a fixed pivotal connection at each end thereof with said tie rods and a sliding pivotal connection with a fixed part on the vehicle at a point intermediate the ends of the lever, the pivotal connection between said lever and one of said tie rods being readily disconnectable, and means for disconnecting said last mentioned pivotal connection, said last mentioned means being operable to connect said lever with a fixed part of the vehicle when said means are actuated to disconnect said last mentioned pivotal connection.

References Cited in the file of this patent

UNITED STATES PATENTS

| | | |
|---|---|---|
| 1,133,838 | Clarke | Mar. 30, 1915 |
| 2,189,453 | Struensee | Feb. 6, 1940 |

FOREIGN PATENTS

| | | |
|---|---|---|
| 53,762 | Norway | Apr. 3, 1934 |
| 300,183 | Italy | Sept. 1, 1932 |